(No Model.)
J. W. WOOD.
DEVICE FOR BINDING AND ELEVATING HAY SLINGS.
No. 415,489. Patented Nov. 19, 1889.
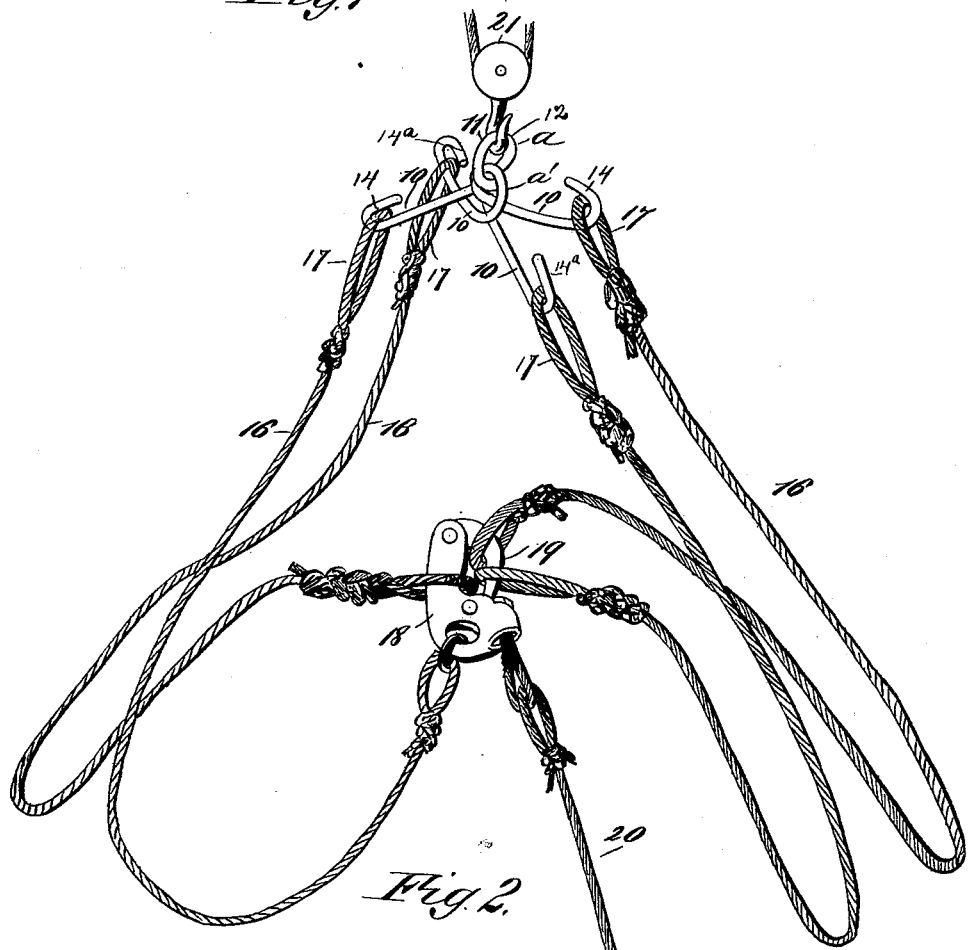
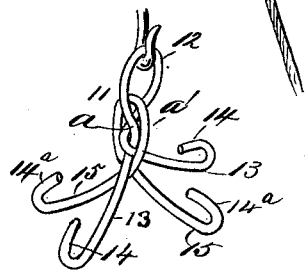
WITNESSES:
Francis McArdle
C. Sedgwick
INVENTOR
J. W. Wood
BY Munn & Co.
ATTORNEY

UNITED STATES PATENT OFFICE.

JOSEPH W. WOOD, OF BARABOO, WISCONSIN, ASSIGNOR TO HIMSELF AND ALVINUS B. WOOD, OF SAME PLACE.

DEVICE FOR BINDING AND ELEVATING HAY-SLINGS.

SPECIFICATION forming part of Letters Patent No. 415,489, dated November 19, 1889.

Application filed February 16, 1889. Serial No. 300,100. (No model.)

*To all whom it may concern:*

Be it known that I, JOSEPH W. WOOD, of Baraboo, in the county of Sauk and State of Wisconsin, have invented a new and useful Device for Binding and Elevating Hay-Slings, of which the following is a full, clear, and exact description.

My invention relates to an improvement in devices for binding and elevating hay-slings, and has for its object to provide a hook of simple and durable construction especially adapted for connection with a hay-carrier and to receive and space the various ropes and chains of hay-slings.

The invention consists in the novel construction of the hook and in the combination of the said hook with the sling, as will be hereinafter fully set forth, and pointed out in the claims.

Reference is to be had to the accompanying drawings, forming a part of this specification, in which similar figures of reference indicate corresponding parts in both the views.

Figure 1 is a perspective view of the hook, illustrating the same as connected with the pendent pulley of the hay-carrier and the hay-sling; and Fig. 2 is a perspective view of the hook detached.

In carrying out the invention the hook is provided with four or more wings or members 10, projected in different directions from the body 11.

In the construction of the hook it is preferably made in two sections $a$ and $a'$, the main section $a$ consisting of a metal rod of suitable length bent upon itself to form a loop-body 12, and wings or members 13, extending in opposite directions from the body at a slight downward inclination, the extremities of which wings or members are bent upward to form a hook 14. The second section $a'$ of the device consists of a suitable bar passing through the body-loop 12 of the main section and carried downward upon opposite sides of the loop to the diverging point of the arms or members 13, at which point the bar is bent upon itself, as illustrated in Fig. 2, and carried downward in opposite directions at a right angle to the members or wings 13 of the main section, whereby two other wings 15 are formed, having their extremities formed severally into a hook $14^a$ in a similar manner to the extremities of the members 13.

Although I have described a specific construction of the device, I desire it to be understood that I do not confine myself thereto, as the body of the hook may be constructed in any other equivalent manner without departing from the spirit of the invention; and I further desire it to be understood that I do not limit myself to the number of wings illustrated as projected from the body of the device.

Each wing of the device is adapted for engagement with one rope or chain 16 of the hay-sling, the said rope or chain being to that end provided at the upper extremity with a loop 17. The lower ends of the several ropes or chains constituting the hay-sling are preferably united by attachment with a rope-clamp 18, as illustrated in Fig. 1, the rope-clamp preferably used being that secured by Letters Patent to J. W. and A. B. Wood, December 4, 1888, No. 393,952, in which three of the ropes or chains are passed over and secured to the clamps by a pivoted tongue 19, the free end of which tongue is socketed in the body of the clamp, the fourth rope or chain of the sling being attached to the said body. The tongue 19 of the rope-clamp is adapted to be released from the body by means of a suitable trip-latch, to which latch the trip-rope 20 is attached.

In the body-loop 12 of the device the hook of the pendent hay-carrier pulley 21 is passed, as shown in both Figs. 1 and 2, and the hay having been properly secured in the sling the load is elevated and taken to any desired point by the proper manipulation of any form of hay-carrier, which carrier, as aforesaid, is attached to the elevating hook or device forming the subject of this application.

When the hay has been carried or elevated—from a wagon, for instance—to a proper point over the hay-mow, by drawing upon the trip-rope 20 the ends of at least two of the ropes or chains constituting the sling will be released and the hay suffered to escape therefrom.

I desire it to be understood that the hook may be constructed of malleable castings or in equivalent manner without departing from the spirit of the invention.

Having thus described my invention, what I claim as new, and desire to secure by Letters Patent, is—

1. A device for binding and elevating hay-slings, consisting of a metal rod bent to form a loop-like body, provided with wings projected from the said body in opposite directions, each terminating in a hook, and a second bar passed through the loop of the body and bent upon itself beneath the same to form outwardly oppositely-projecting wings, each terminating in a hook, which wings extend from the body in an opposite direction to the wings of the body-section, substantially as shown and described.

2. In a device for binding and elevating hay-slings, the combination, with a vertical loop-like body provided with wings radiating from the base of said body, having the extremity of each terminating in a hook, of ropes or chains constituting the hay-sling, looped at one end to engage with the hook-like extremities of the said wings, and a clamp uniting the lower extremities of the said ropes or chains, substantially as and for the purpose specified.

JOSEPH W. WOOD.

Witnesses:
R. D. EVANS,
W. A. SIMONDS.